United States Patent
Xu et al.

(10) Patent No.: US 7,209,544 B2
(45) Date of Patent: Apr. 24, 2007

(54) X-RAY TUBE CATHODE ASSEMBLY AND INTERFACE REACTION JOINING PROCESS

(75) Inventors: Paul Xu, Oswego, IL (US); George Awad, Oswego, IL (US); Salvatore Perno, Winfield, IL (US); Qing K. Lu, Aurora, IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 63 days.

(21) Appl. No.: 10/547,197

(22) PCT Filed: Feb. 20, 2004

(86) PCT No.: PCT/IB2004/000549

§ 371 (c)(1), (2), (4) Date: Aug. 26, 2005

(87) PCT Pub. No.: WO2004/079762

PCT Pub. Date: Sep. 16, 2004

(65) Prior Publication Data

US 2006/0140344 A1    Jun. 29, 2006

Related U.S. Application Data

(60) Provisional application No. 60/451,557, filed on Mar. 3, 2003.

(51) Int. Cl.
*H01J 35/06* (2006.01)
*H01J 35/14* (2006.01)
*H01J 35/30* (2006.01)

(52) U.S. Cl. .................. 378/136; 378/137; 378/138

(58) Field of Classification Search ............ 378/136, 378/137, 138
See application file for complete search history.

(56) References Cited

U.S. PATENT DOCUMENTS

| 4,624,404 A | 11/1986 | Ohmae et al. |
| 4,685,118 A | 8/1987 | Furbee et al. |

(Continued)

FOREIGN PATENT DOCUMENTS

| EP | 0 743 131 A1 | 11/1996 |

(Continued)

*Primary Examiner*—Allen C. Ho

(57) ABSTRACT

An x-ray tube cathode assembly (28) includes a support arm (36) comprising a first metal. A ceramic insulator (70, 82) has a first metalized surface (72, 86) wherein the metalized surfaces comprise a desired amount of the first metal. A first member of filler material (90) is in contact with the support arm (36) and the first metalized surface (72, 86) of the ceramic insulator (70, 82), the first member of filler material comprising at least a second metal (96a, 96b) wherein a first alloy system (FIG. 5) comprising the first and second metals includes an alloy minimum point percentage composition (P) of the first and second metals having a first alloy system minimum melting point (M) for the alloy minimum point percentage composition that is lower than both of the melting point of the first metal and second metal. A bonding region resulting from heating the cathode assembly causing diffusion bonding to proceed, the bonding region has a layer of alloy comprising the minimum point percentage composition (P) and the heating of the cathode assembly continues to a bonding temperature of at least the first alloy system minimum melting point (M) and holding at that temperature for a desired period of time.

20 Claims, 5 Drawing Sheets

U.S. PATENT DOCUMENTS

| | | |
|---|---|---|
| 4,689,809 A | 8/1987 | Sohval |
| 4,736,400 A | 4/1988 | Koller et al. |
| 5,031,200 A * | 7/1991 | Plessis et al. .............. 378/136 |
| 5,065,420 A | 11/1991 | Levene |
| 5,224,143 A | 6/1993 | Dumitrescu et al. |
| 5,498,185 A * | 3/1996 | Knudsen et al. .............. 445/28 |
| 5,515,413 A * | 5/1996 | Knudsen et al. ............ 378/136 |
| 5,526,396 A * | 6/1996 | Jacob ........................ 378/136 |
| 6,801,599 B1 * | 10/2004 | Kautz et al. ................ 378/138 |

FOREIGN PATENT DOCUMENTS

| | | |
|---|---|---|
| GB | 1 426 873 | 5/1972 |
| GB | 2 049 522 A | 12/1980 |
| JP | 59-190280 | 10/1984 |
| JP | 07-018419 | 1/1995 |

* cited by examiner

X-RAY TUBE CATHODE ASSEMBLY AND INTERFACE REACTION JOINING PROCESS

CROSS REFERENCE TO RELATED APPLICATIONS

This application claims the benefit of U.S. provisional application Ser. No. 60/451,557 filed Mar. 3, 2003, which is incorporated herein by reference.

The present invention relates to a method for joining a metal part to a ceramic part and is particularly related to a hybrid method for joining the parts with reduced overflow of filler material onto un-joined surfaces. The present invention finds particular application in conjunction with joined metal and ceramic parts in x-ray tubes operated under high voltage and high temperature and will be described with particular respect thereto.

Conventional diagnostic use of x-radiation includes the form of radiography, in which a still shadow image of the patient is produced on x-ray film, fluoroscopy, and computed tomography (CT) in which complete patient images are digitally constructed from x-rays produced by a high powered x-ray tube rotated about a patient's body.

Typically, the x-ray tube includes an evacuated envelope made of metal or glass which is supported within an x-ray tube housing. The x-ray tube housing provides shielding for containing the x-rays and provides electrical connections to the envelope. The housing is filled with a fluid, such as oil, to aid in cooling components housed within the envelope. The envelope and the x-ray tube housing each include an x-ray transmissive window aligned with one another such that x-rays produced within the envelope may be directed to a patient or subject under examination. In order to produce x-rays, the envelope houses a cathode assembly and an anode assembly.

The cathode assembly includes a cathode filament through which a heating current is passed. This current heats the filament sufficiently that a cloud of electrons is emitted, i.e. thermionic emission occurs. A high potential, on the order of 100–200 kV, is applied between the cathode assembly and the anode assembly. This potential causes the emitted electrons to flow from the cathode assembly to the anode assembly through the evacuated region in the interior of the evacuated envelope. A cathode focusing cup, housing the cathode filament, focuses the electrons onto a small area or focal spot on a target of the anode assembly.

Some cathode cup structures include electrically biased deflector elements for deflecting the beam of electrons generated at cathode and directed to the anode. A trend toward shorter x-ray exposure times in radiography has placed an emphasis on having a greater intensity of radiation and hence higher electron currents. In addition, the electrical bias voltage is applied to the detector elements in order to control, to some extent, the size and/or shape of the focal spot.

One way to control the size of the focal spot of the electrons on the anode is shown in U.S. Pat. No. 4,689,809. A cathode cup is split into two portions or deflector elements, housing or surrounding the filament. The deflector elements are biased equal to or negative voltage with respect to the filament. The biased cup reduces unwanted "wings," or diffused areas, appearing as part of the x-ray focal spot. Other cathode cup and filament arrangements for controlling the size and shape of the electron focal spot on the tube anode are discussed in U.S. Pat. No. 4,685,118, U.S. Pat. No. 5,224,143, and U.S. Pat. No. 5,065,420. These configurations find particular application in conjunction with rotating anode x-ray tubes for CT scanners. Increasing the intensity of x-rays manner can increase the operating temperature of components within the x-ray tube.

To reduce the power requirements of the focusing system and to maintain accurate positioning of the filament relative to the deflectors, it is desirable to mount both the deflectors and the filament to the same cathode support. Cathode cups thus typically include a base or arm portion which supports the filament and a pair of deflectors. The deflectors, which have the bias voltage applied to them, are mechanically mounted to the base, but are electrically insulated from it. This is achieved through the use of ceramic insulators which are brazed to both the base and the deflectors in the form of a sandwich. The ceramic insulators include central bores through which a bolt is received for maintaining alignment of the components during brazing. To avoid shorting, the bolt is electrically isolated from the base, which is at the x-ray tube operating high voltage. Such a cathode cup design is difficult to assemble, difficult to align, and is susceptible to shorting. This can occur if the material used to braze the ceramic insulator to the base or the deflector flows into the insulator bore that receives the bolt or out of the joint between the two joined surfaces, a possibility when the brazing material is melted. In addition, arcing caused by shorting across areas where brazing material flows from joint surfaces to un-joined surfaces can result in incorrect image data sets possibly resulting in undesirable image data.

During operation of the x-ray tube, the electron beam impinges the target with sufficient energy that x-rays are generated. A portion of the x-rays generated pass through the x-ray transmissive windows of the envelope and x-ray tube housing to a beam limiting device, or collimator, attached to the x-ray tube housing. The x-ray beam so directed toward a patient or subject under examination thereby allows images to be constructed.

In many high powered x-ray tube applications such as CT, the generation of x-rays often causes portions of the anode assembly to be heated to a temperature range of 1200°–1800° C. Temperatures can reach 2500° C. at the focal spot of the anode in some x-ray tubes. While not subject to the same high temperatures as the focal track of the anode, portions of the cathode assembly in some high power x-ray tubes in emerging systems reach temperatures of 850° C.–900° C. These temperatures can be present at the brazed joints between the ceramic and metal components of the electron beam deflectors and cathode support. One of the traditional brazing material for these joints in present x-ray tubes is Cusil brazing material (an Ag—Cu alloy). The melting point of Cusil is 780° C. Higher power x-ray tubes for emerging systems are resulting in higher temperatures for the cathode assembly components. Thus, in high power x-ray tubes where the cathode assembly can reach temperatures of 900° C., traditional brazing and filler materials are not suitable.

In addition, even for lower cathode temperatures in present systems, conventional brazing often results in leakage of molten brazing material onto un-joined surfaces. This results in loss of high voltage integrity as the spilled over brazing material provides a path for electrical leakage in the high voltage x-ray tube.

The present invention provides a hybrid method for joining ceramic and metal surfaces, for high voltage and high temperature operating environments, which overcomes the above-referenced problems and others.

The present invention is directed to a hybrid brazing and diffusion bonding method of joining metal and ceramic component parts together that satisfies the need to provide a strong parallel joined components for use in high temperature and high voltage operation conditions. A method in accordance with one aspect of the present invention includes heating the joined assembled components to facilitate the diffusion reaction of two contacted metals in which an area or layer within the alloy composition forms that corresponds to the minimum melting temperature of the alloy system. Upon heating to the minimum melting temperature of the alloy system, a limited amount of liquid alloy forms in this area during heating to the minimum melting point. The limited amount of liquid alloy wets both metals. Then, additional diffusion occurs during cooling to steady state room temperature forming a joining or bonding region layer.

In accordance with another method employing aspects of the present invention for bonding cathode components of an x-ray tube together, the method includes providing a support arm comprising a first metal and providing a ceramic insulator having a first metalized surface. A sandwich structure is assembled including the support arm and ceramic insulator by placing a first member of filler material between the support arm and the first metalized surface of the ceramic insulator. The first member of filler material comprises at least a second metal wherein a first alloy system comprising the first and second metals includes an alloy minimum point percentage composition of the first and second metals having a first alloy system minimum melting point for the alloy minimum point percentage composition that is lower than both of the melting point of the first metal and second metal. The method includes heating the assembled sandwich structure causing diffusion between the first metal and second metal thereby forming a varying percentage composition of the first and second metals of the first alloy system across a bonding region. The bonding region has at least one diffusion layer of the alloy minimum point percentage composition of the first and second metals. The heating of the assembled sandwich structure continues to a bonding temperature of at least the first alloy system minimum melting point. The temperature is held at the bonding temperature for a desired period of time to melt a desired portion of the bonding region comprising at least the alloy minimum point percentage composition of the first and second metals. The assembled sandwich structure is allowed to cool to a steady state temperature below first alloy system minimum melting point temperature.

In accordance with a more limited aspect of a method employing aspects of the present invention, the member of filler material includes a third metal different from the first and second metals and the second metal is plated on opposite sides of the third metal. The second and third metal are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

In accordance with an apparatus in accordance with aspects of the present invention, an x-ray tube cathode assembly has a support arm comprising a first metal. A ceramic insulator has a first metalized surface wherein the metalized surfaces comprise a desired amount of the first metal. A first member of filler material is in contact with the support arm and the first metalized surface of the ceramic insulator, the first member of filler material comprising at least a second metal wherein a first alloy system comprising the first and second metals includes an alloy minimum point percentage composition of the first and second metals having a first alloy system minimum melting point for the alloy minimum point percentage composition that is lower than both of the melting point of the first metal and second metal. A bonding region resulting from heating the cathode assembly causing diffusion bonding to proceed, the bonding region has a layer of alloy comprising the minimum point percentage composition and the heating of the cathode assembly continues to a bonding temperature of at least the first alloy system minimum melting point and holding at that temperature for a desired period of time.

In accordance with another aspect of an apparatus applying principles of the present invention, the member of filler material includes a third metal different from the first and second metals and the second metal is plated on opposite sides of the third metal. The second and third metals are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

One advantage of at least one embodiment of the present invention is that the bonding of ceramic insulators to a cathode arm with less leakage of bonding material onto un-joined surfaces, thereby improving electrical resistance of the assembly.

Another advantage of at least one embodiment the present invention is that it reduces arcing in x-ray tubes by reducing leakage of bonding material on the un-joined surfaces, thereby improving x-ray images.

Yet another advantage of the present invention is that the bond between the cathode components can operate at higher operating temperatures than those using conventional brazing only methods for joining components.

Yet further advantages of the present invention will become apparent to those of ordinary skill in the art upon reading and understanding the following description of the embodiments of the present invention. The following description and accompanying drawings set forth certain illustrative embodiments applying principles of the present invention that provide the foregoing and other features hereinafter described and particularly pointed out in the claims. It is to be appreciated that different embodiments applying principles of the invention may take form in various components and arrangements of components. These described embodiments being indicative of but a few of the various ways in which the principles of the invention may be employed. The drawings are only for the purpose of illustrating a preferred embodiment of an apparatus applying principles of the present invention and are not to be construed as limiting the invention.

The foregoing and other features and advantages of the present invention will become apparent to those skilled in the art to which the present invention relates upon consideration of the following detailed description of a preferred embodiment of the invention with reference to the accompanying drawings, wherein.

Figure 1:
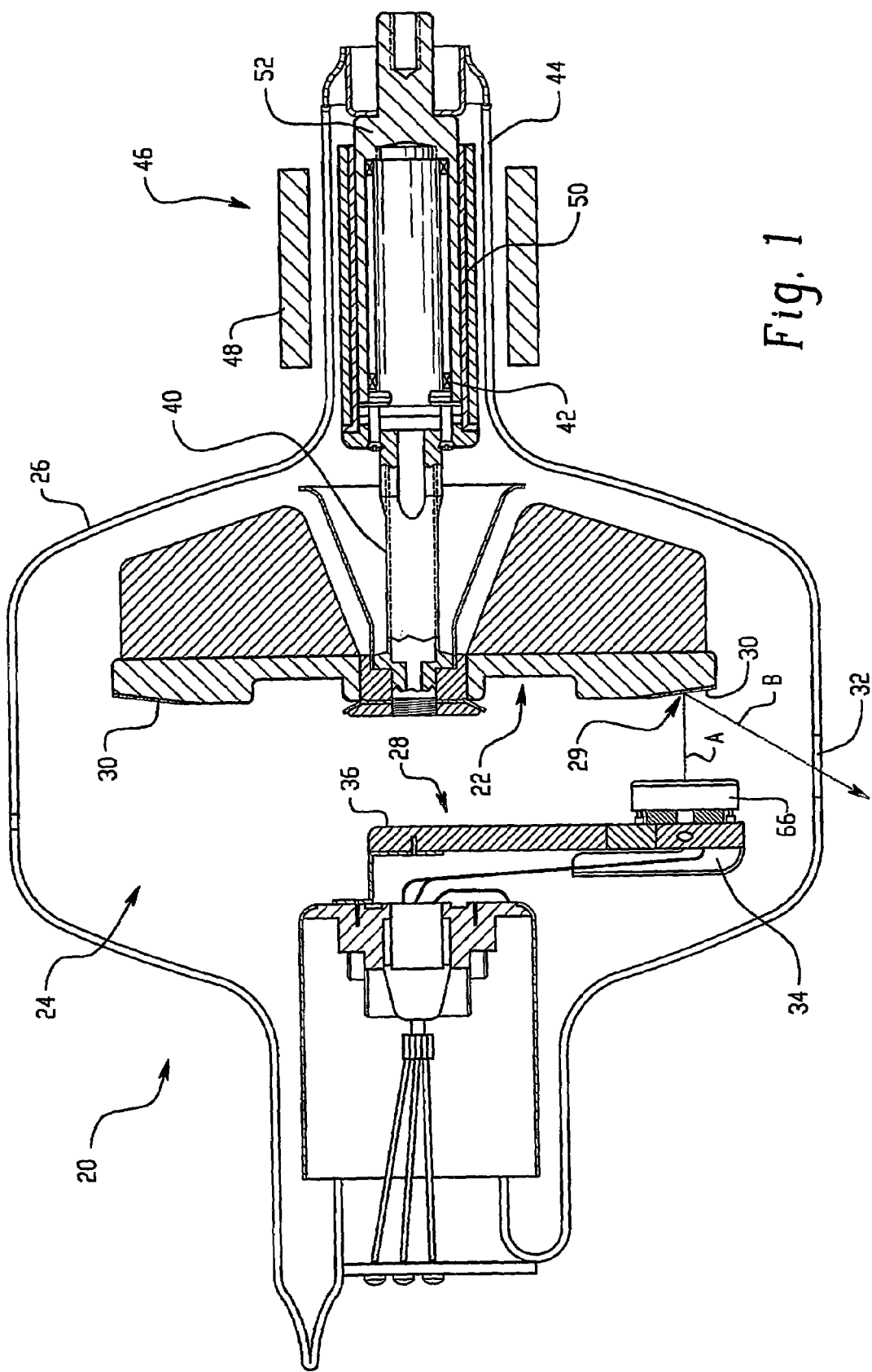
FIG. 1 is a schematic sectional view of a rotating anode x-ray tube including a cathode assembly made according to principles of the present invention.

With reference to FIG. 1, a rotating anode x-ray tube 20 of the type used in medical diagnostic systems for providing a beam of x-ray radiation is shown. The tube includes an anode 22 which is rotatably mounted in an evacuated chamber 24, defined by an envelope 26. A heated element cathode assembly 28 supplies and focuses an electron beam A. The cathode is high voltage biased, relative to the anode 22, such that the electron beam flows to the anode and strikes a focal spot 29 on an annular target area 30 of the anode. A portion of the beam striking the target area is converted to x-rays B, which are emitted from the x-ray tube through a window 32 in the envelope. The cathode assembly 28 includes a cathode cup or head 34, which is supported in the envelope by an arm 36 of a cathode support assembly 28.

The target 30 of the anode is connected to a shaft 40, which is supported by bearings 42 in a neck portion 44 of the evacuated envelope 26 and driven by an induction motor 46. The induction motor includes a stator 48, outside the envelope, which rotates a rotor 50 connected to the shaft relative to a stationary bearing housing 52. The anode is rotated at high speed during operation of the tube. It is to be appreciated that the invention is also applicable to other devices which operate under similar conditions as well as stationary anode x-ray tubes, rotating cathode tubes, and other electrode vacuum tubes.

Figure 2:
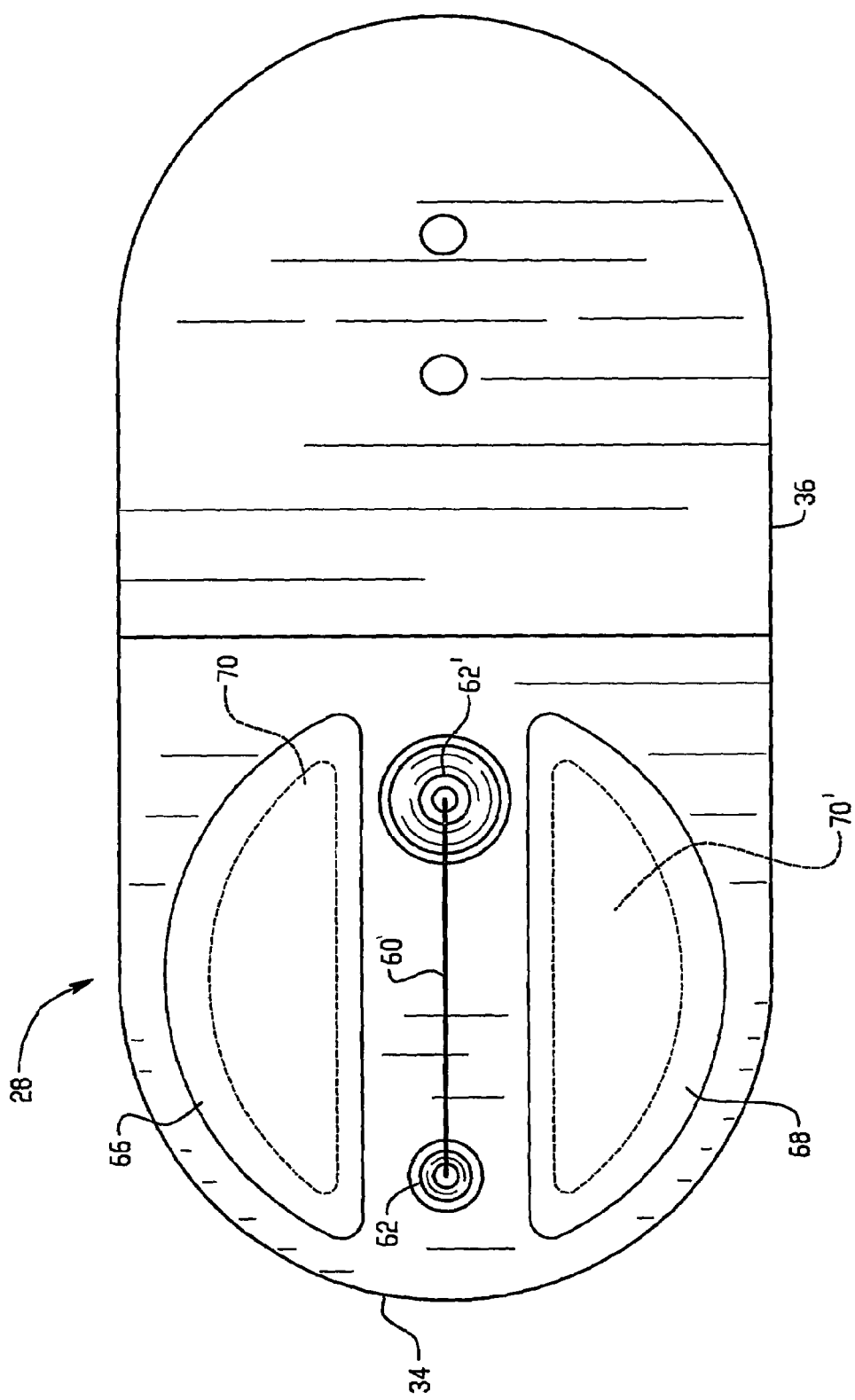
FIG. 2 is a top view of the cathode assembly of the x-ray tube of FIG. 1.
Figure 3:
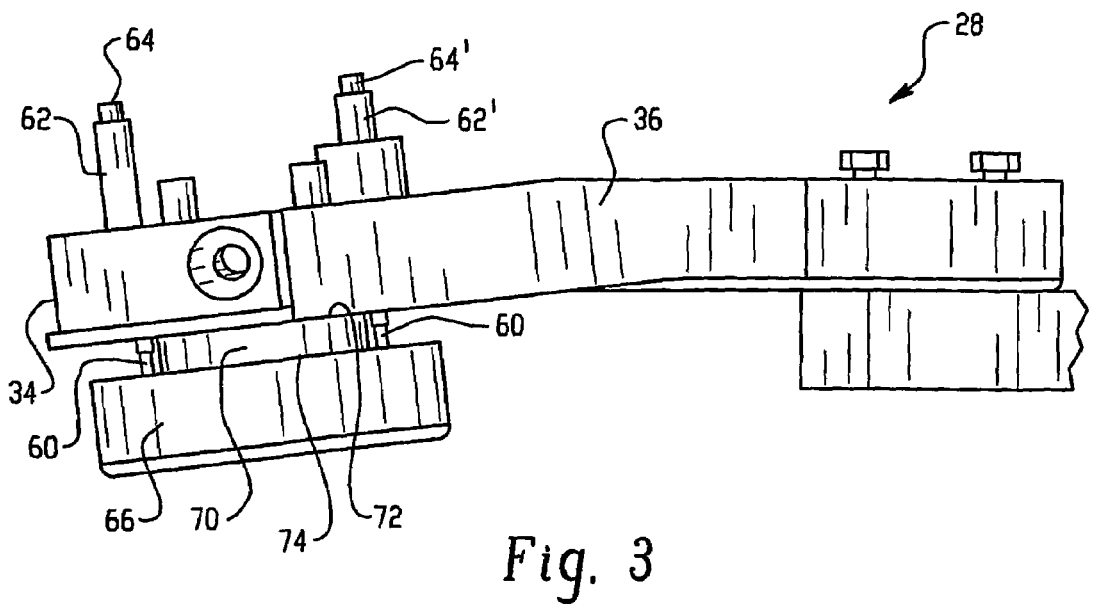
FIG. 3 is a side view of a cathode assembly of FIG. 2.

Turning now to FIGS. 2 and 3, the cathode assembly 28 made by the method according to the present invention will be further described. The arm 36 extends to support the cup or head 34 and a cathode filament 60, typically made of tungsten. Filament supports 62, 62' supporting respective ends 64, 64' of the filament are received through corresponding bores which extend axially through the base such that an electron-emitting portion of the filament is spaced from the base. It will be appreciated that two or more filaments may be used in place of the single filament shown, if desired. The filament supports 62, 62' may be formed from ceramic, or other suitable electrically insulating material The ends 64, 64' of the tungsten filament are received through respective bores in the supports 62, 62'. The filament is connected by conductors to a suitable power source outside the envelope. Although a wire filament is illustrated, it is to be understood that other electron sources are also contemplated, including thin film filaments, and the like.

Deflectors 66, 68 are carried by the arm 36 in a manner which electrically insulates the deflectors from the arm. Insulators 70, 70' are joined between the arm and deflectors using the method of the present invention further described below. Referring to FIG. 3, the insulator 70 is joined at a first insulator surface 72 to the arm 36 and is joined at a second insulator surface 74 to the deflector 66. Insulator 70' (shown in phantom in FIG. 2) joins the deflector 68 in a similar manner to the arm 36. Two deflectors and two insulators are shown in FIG. 2, although a single deflector/insulator, or more than two deflectors/insulators, could alternatively be used in a number of suitable arrangements. The deflectors are electrically connected to suitable deflector bias voltage source (connections and voltage source not shown) in a known manner and are positioned in close proximity to the filament 60 for deflecting, shaping and/or focusing the beam of electrons emitted by the filament. This allows the size, shape and location of the focal spot 29 on the target (FIG. 1) to be controlled and adjusted. The deflector bias voltage supplies may be computer controlled to permit automatic control of the width and positioning of the focal spot to a multiplicity of locations.

As shown in FIG. 2, the deflectors 66, 68 in this example embodiment are generally mirror images of each other and are positioned on opposite sides of the filament 60. The deflectors 66, 68 may be formed from molybdenum, or other suitable temperature tolerant, electrically conductive material. The arm 36 may also be formed from molybdenum, or may be formed from less expensive, easier to machine materials, such as nickel, since the arm does not need to withstand as high temperatures as the deflectors. The selected deflector materials have high melting point and low vapor pressure at high temperature. The deflectors are rigidly and precisely mounted over the ceramic insulator block. The ceramic insulator is used to insulate filament potential (cathode potential which causes the flow of electrons from the cathode to anode) from deflector potentials which control the shape and location of the electron beam and focal spot as described above. These ceramic insulators are attached to cathode arm or base. Temperature at the joints could be as high as 850° C. to 900° C. Therefore, in order to obtain a stable focal spot, these joints should meet the following criteria: they should be rigid and ductile, even at high temperature up to 900 C, They should be suitable for high voltage application's without electrical leakage and it is desirable for the parallelism of the two deflectors of the cathode cup relative to the arm is within approximately 0.0025". The hybrid method of brazing and diffusion bonding used according to aspects of the present provides for a cathode structure that meets these criteria.

With continued reference to FIGS. 2 and 3, the deflectors 66, 68 are spaced apart and insulated from the base by the insulator 70. As shown in FIG. 2, each deflector has an associated insulator. It will be appreciated that two (or more) insulators can be used for each deflector, spaced longitudinally from each other. For ease of reference, the cathode will be described with reference to two deflectors, each having one respective insulator.

Figure 4:
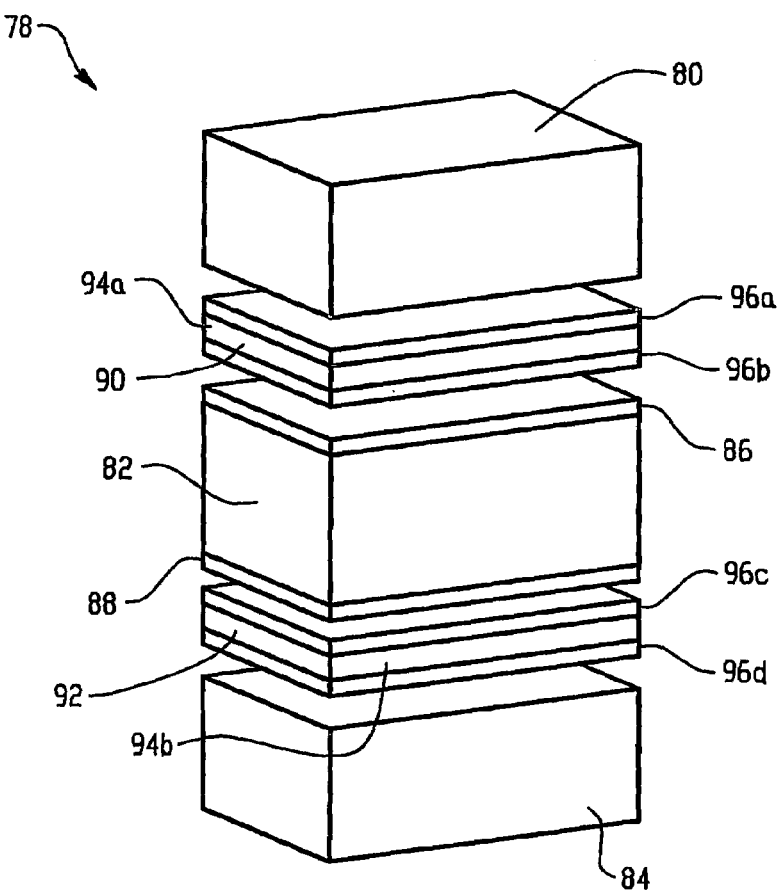
FIG. 4 is an exploded perspective view showing layers of material used in aspects of the method of the present invention.

Turning now to FIG. 4, shows an example of a suitable sandwich arrangement including materials representative of those found in a cathode assembly, as well as suitable joining materials, for combining a metal-ceramic-metal structure made according to a method utilizing principles of the present invention. In one embodiment of a structure suitable for use according to a method applying principles of the present invention, a sandwich structure 78 includes a first metal component 80 at one end of the sandwich structure, a ceramic component 82 followed by a second metal component 84. In this example the first metal component 80 and second metal component 84 are made of nickel or nickel alloy and the ceramic is metalized and nickel plated with a nickel plate layers 86 and 88. In an x-ray tube cathode assembly, the metal component 80 may correspond to the arm 36, the ceramic 82 corresponds to the insulators 70, 70' and the metal component 84 correspond to deflectors 66, 68.

The joint surfaces of the ceramic pieces are metalized with Mo—Mn or W—Mn, followed by the Ni plating 86, 88. A suitable thickness of metalizing layer is approximately 0.0004" to 0.0012" and for the Ni plating layers approximately 0.0001" to 0.0003". The sandwiched ceramic to metal layers are separated by gold plated copper sheets 90, 92 which act as bonding filler material between the metal and ceramic parts. Each sheet 90, 92 has a copper core 94a, 94b and two gold plate layers. Copper sheet 94a has gold layers 96a, 96b and copper sheet 94b has gold layers 96c, 96d. The thickness of copper sheet can vary from 0.002" to 0.0 10" or even thicker, depending on application. The thickness of gold plating layer can vary from 0.0002" to 0.001". A suitable thickness of gold plating is 0.0005".

A method of making a sandwich structure according to one embodiment applying aspects of the present invention includes clamping the suitably arranged and positioned nickel metal component 80, the metal filler gold plated copper sheets 90, 92, the suitably prepared ceramic piece 82 and second nickel metal component together with a stainless or graphite fixture (not shown), depending on furnace atmosphere, in order to prevent the parts from sticking to the fixture. The parts are clamped in a manner known in the art.

The clamped assembly of the sandwich structure and bonding materials is heated in a hydrogen or vacuum furnace to 960° C.–970° C. for a short period of time, typically 10 seconds to 1 minute. Next, the furnace is cooled to 30° C. The assembly is removed from the furnace and the clamping fixture is removed.

During the heating and cooling portion of the method according to aspects of the present invention, the adjacent layers of Au and Ni mutually diffuse at a faster rate into one another. Therefore, at each of the Au—Ni interfaces, a diffusion layer of Ni—Au alloy develops. In this Au—Ni alloy diffusion layer, the percentage of An and Ni varies gradually, from pure nickel on one side of Ni—Au alloy to pure Au at the opposite side. Therefore, referring to FIG. 5, within the varying continuum of diffused percentage of elements, there is an area or layer containing 82% Au and 18% Ni shown at point "P". This particular percentage composition layer is the alloy composition of the minimum melting point "M" shown in the Au—Ni phase diagram. The melting point of this 82% Au–18% Ni alloy layer is approximately 955° C.

Figure 5:
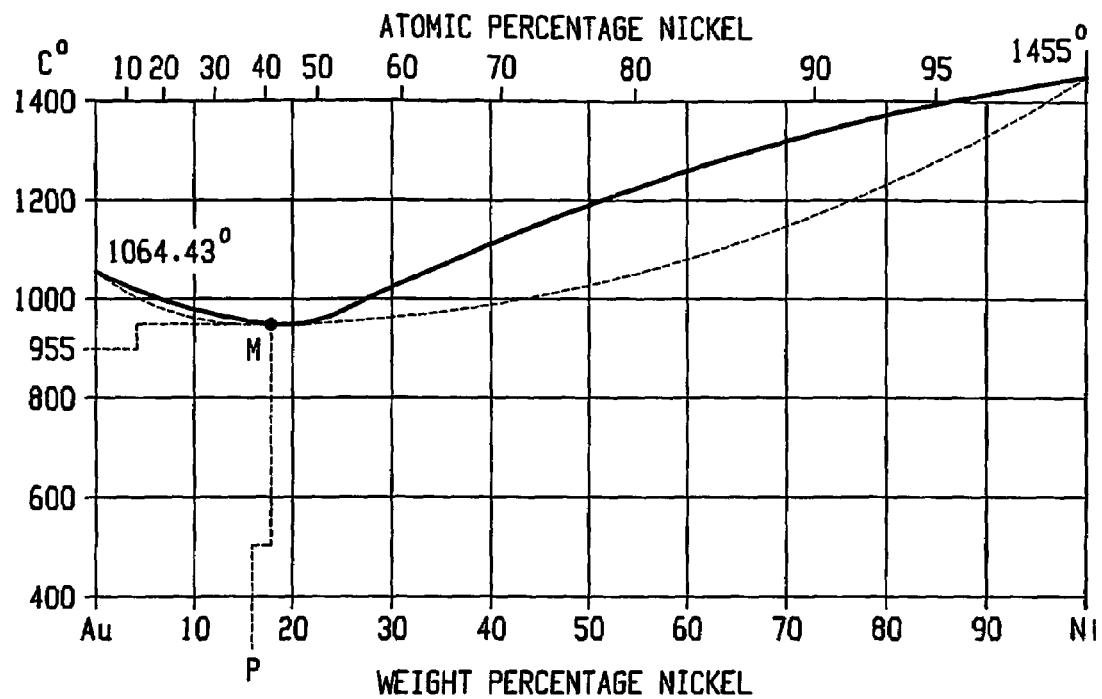
FIG. 5 is a phase diagram for an example of an alloy suitable for application according to principles of the present invention.
Figure 7:
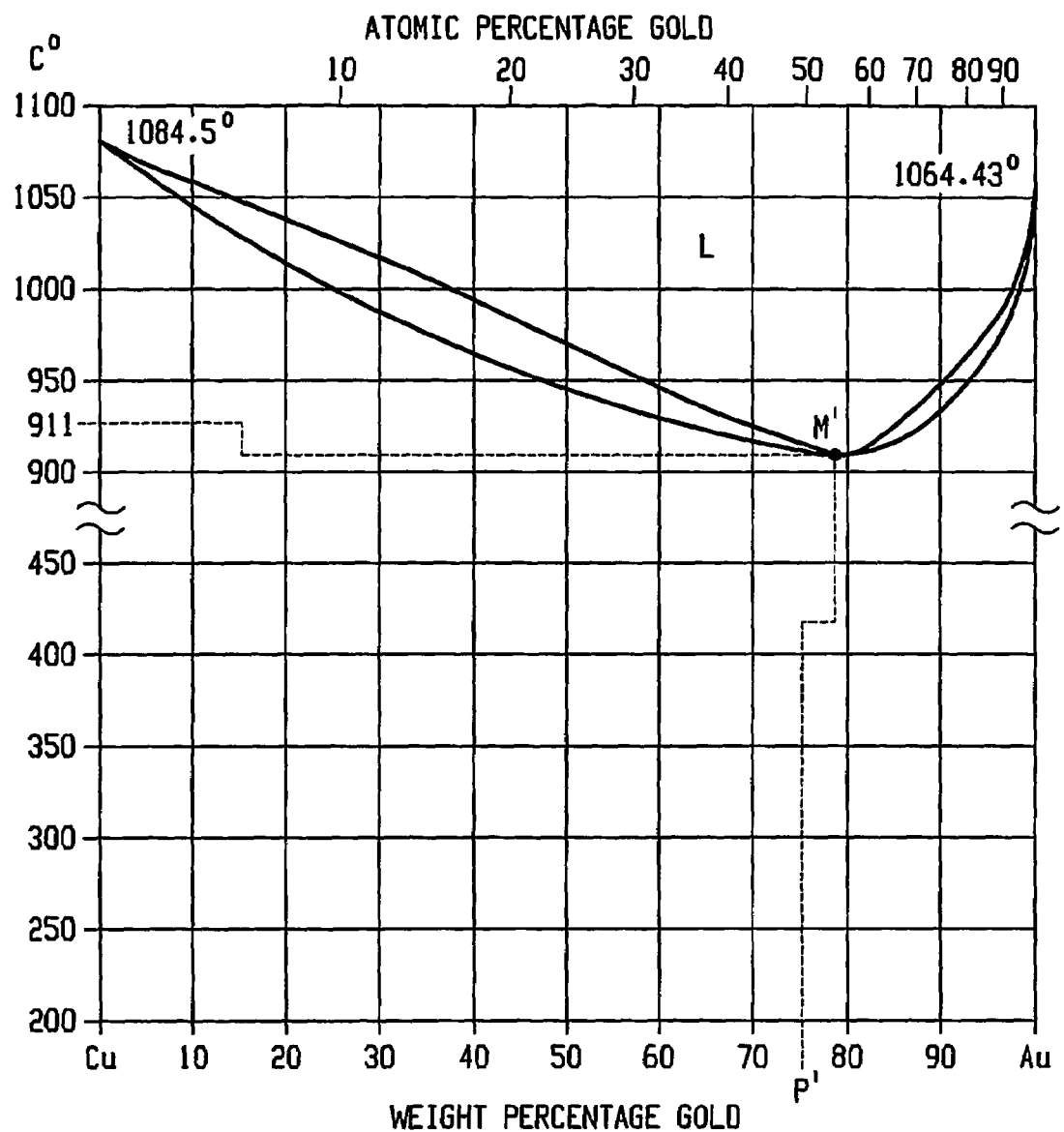
FIG. 7 is a phase diagram for an example of another alloy suitable for application according to principles of the present invention.

Continuing to refer to FIG. 5, the melting point of Au is shown as approximately 1064° C. and the melting point of nickel is approximately 1455° C. As the adjacent layers of Au and Ni diffuse, the melting point of the different percent combination of the diffused alloy changes. More specifically, as alloy forms by diffusion the melting point decreases from that of Au to approximately 955° C. at the minimum point M (82% Au–18% Ni), and then begins to increase to the melting point of Ni. Different percentage combinations of the alloy elements have different melting points. Other alloys of different components having minimum points and similar changes in the phase diagram may be used according to principles of the present invention, as long as they are suitable for the operating conditions and materials found in X-ray tubes. For example, FIG. 7 shows another similar suitable alloy in the gold-copper phase diagram having a minimum point M' and melting temperature at approximately 911° C. for an alloy combination of approximately 80% Au–20% Cu.

As the clamped together cathode assembly and Au—Cu sheets are heated to 960° C. to 970° C. for 10 seconds to 1 minute, the Au—Ni alloy in the minimum point P composition layer or area melts first, followed by dissolving more Au and Ni atoms into the liquid alloy. With appropriate control of the process at the minimum temperature M (e.g., temperature and time), a desired limited amount of liquid alloy is present in the Au—Ni diffusion layer. The liquid alloy wets surrounding Au—Ni alloy in the diffusion layer.

As the sandwich structure is cooling down, the liquid alloy solidifies. Meanwhile, mutual diffusion between Ni and Au, as well as between Au and Cu, continue until the temperature is low enough not to have significant diffusion. The same reaction occurs at all gold/nickel and gold/copper contacting surfaces. In tests, a 0.020" thick joining layer between the metal-ceramic interfaces was obtained according to preceding process practicing aspects of the present invention.

During the process described above, a number of bonding regions form that include surfaces of the metal components of the cathode assembly, the gold plated copper sheets or members of filler material and the metallized surfaces of the ceramic insulators. At the interfaces of the different metals, the bonding regions are subject to the phase diagrams relative to the particular alloy system of the adjacent metals which form by diffusion and the limitations of that process. The varied percentage composition of the respective alloys and the diffusion layer of the respective alloy minimum point percentage composition (P, P') is a result of the diffusion process over time and temperature.

While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

For example, alternate material combinations in the sandwich structures and joining layers of bonding filler materials may include the following combinations, as well as others, applying principles of the present invention.

Figure 6:
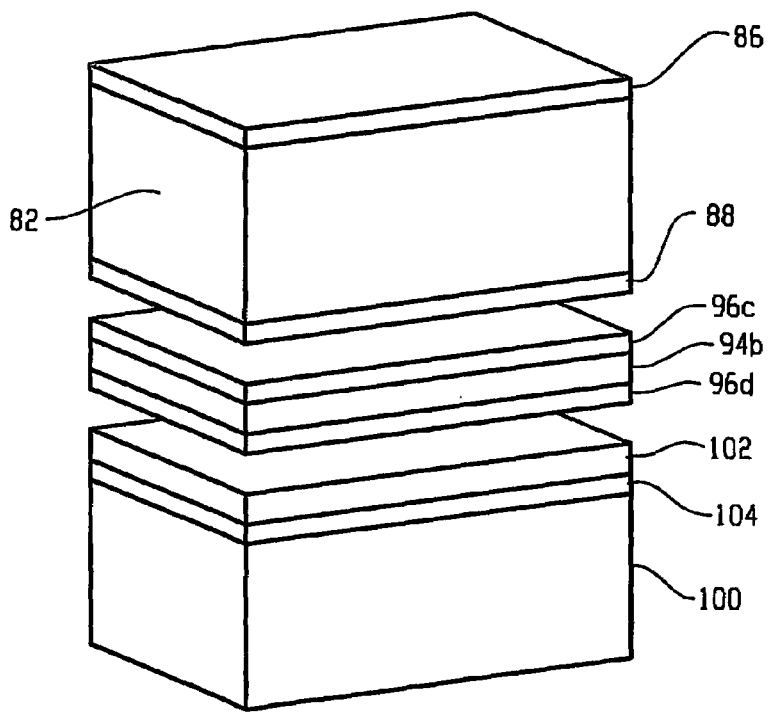
FIG. 6 is an exploded perspective view or another combination of layers of material used in another embodiment illustrating aspects of the method of the present invention.

More specific examples additional embodiments of structures having various metals, bonding filler material alloys and prepared ceramic structures suitable for application with principles of this invention include molybdenum Mo to Ceramic or tungsten W to Ceramic for joining a Mo or W ceramic sandwich system. A similar process is used as described above except that the molybdenum or tungsten part is first brazed to a nickel sheet. Referring to FIG. 6, a molybdenum part 100 has a nickel sheet 102 bonded with a copper brazing shim 104. With the nickel sheet attached to the Mo part, the joining of Mo to ceramic becomes the process of joining Ni to ceramic, as described above. The remaining element numbers in FIG. 6 correspond to the element numbers as described with respect to FIG. 4. The additional metal part (corresponding to 80 in FIG. 4) to complete the metal-ceramic-metal sandwich is not shown. The thickness of nickel sheet can be 0.004"–0.010" and the brazing alloy to attach the nickel to the Mo is a thin copper sheet.

Another combination of materials that are applicable according to aspects of the present invention include (i) Kovar to ceramic or (ii) Fe/Ni alloy to ceramic. Kovar and Fe/Ni alloy contain a suitable amount of Ni, therefore, the hybrid interface reaction process to join the ceramic to these metals is similar to the process of joining Ni to ceramic with Au plated copper sheet in accordance with aspects of the present invention. However, in this embodiment, the holding time at 960° C. to 970° C. is increased.

In yet another example of materials that can be used according to aspects of the present invention, Fe to ceramic components are joined. For joining Fe to ceramic system with Au plated Cu brazing alloy, the iron part is Ni plated.

Once a nickel surface is present on a joined surface, the joining of Fe to ceramic becomes the process of joining Ni to ceramic as described above.

In another example of materials used according to principles of the present invention, Cu to ceramic parts are joined. For joining a Cu to ceramic system, the brazing alloy is also a Au plated copper filler material. The Au—Cu binary phase diagram of FIG. 7 is similar, in the following aspects, to the Au—Ni phase diagram of FIG. 5. There is a temperature minimum point M' in the phase diagram at which a specific alloy composition results in a little liquid metal alloy being present for the interface reaction joining process. The limited melting of alloy at this minimum point and continued diffusion bonding as the filler material continues to cool is similar to the process described above. However, the heating temperature, in this example, is controlled at approximately 920° C. to 930° C.

It is to be appreciated that in the examples described above for Au—Ni, that the minimum point M is approximately 955° C. and the gold plated copper sheet filler material has a minimum point M' of approximately 911° C. Upon heating the sandwich system described above to 955° C. with respect to FIG. 4, the minimum point M' of the Au—Cu metal alloy system shown in FIG. 7 is also exceeded. This heating to the minimum point M in FIG. 5 of 955° C. creates a plurality of layers through the interface reaction bonding system that have a controlled amount of liquid during heating. Some liquid layers due the Au—Ni interfaces and some layers due to the Au—Cu interfaces in the filler material. As described above limiting the amount of liquid in this manner reduces liquid leakage to un-joined surfaces.

Advantages of the hybrid interface reaction joining process of the present invention, compared to a conventional process that is entirely brazing, include forming a small amount of liquid in the joint thereby reducing overflow from the joined surfaces onto the un-joined surfaces. Compared to a process that is entirely diffusion bonding, the integrity of bonds created according to aspects of the present hybrid method is that the x-ray assembly is better because of a thicker bonded joint (0.020") than regular diffusion bonding. In addition, conventional increased pressure associated with diffusion bonding is not required to bond metal and ceramic parts together.

In combined metal-ceramic cathode structures manufactured with a method applying aspects of the present invention, parallelism between the joined surfaces and component parts is less than 0.0025". In examples using one of the alloy combinations described above, the joint can be used at high x-ray tube cathode arm operating temperature (e.g. 900° C.). The reaction of two clamped contacted metals during the heating process results in an area or layer having a composition, from diffusion, corresponding to the minimum point (M, M') melting temperature. Upon heating the clamped assembly and bonding filler material to the minimum point temperature (M, M'), liquid alloy forms in this area. The liquid wets both metals for a brazed portion of the bond. Then, diffusion occurs during cooling, thus forming a thick joining layer between the metal-ceramic components of the sandwich structure.

The structure manufactured according to principles of the present invention of hybrid interface reaction joining has high electrical resistance across the ceramic in a metal-ceramic-metal sandwich type structure. Only a little brazing material melts in the process. The rest of the bonding relies on diffusion bonding. Therefore, with this hybrid combination of brazing and diffusion bonding, the amount of brazing liquid is kept to a desired amount by selecting alloy combinations with a minimum point and controlling the time and temperature of the process to control the amount of liquid that forms during the process. Because only a small amount of liquid exists for a short time (e.g. a few seconds), liquid flow to the side walls of ceramic is reduced and this can prevent electrical leakage across un-joined surfaces.

The invention claimed is:

1. A method for bonding cathode components of an x-ray tube together, the method comprising:
   providing a support arm comprising a first metal;
   providing a ceramic insulator having a first metalized surface;
   assembling a sandwich structure including the support arm and ceramic insulator by placing a first member of filler material between the support arm and the first metalized surface of the ceramic insulator, the first member of filler material comprises at least a second metal wherein a first alloy system comprising the first and second metals includes an alloy minimum point percentage composition of the first and second metals having a first alloy system minimum melting point for the alloy minimum point percentage composition that is lower than both of the melting point of the first metal and second metal;
   heating the assembled sandwich structure causing diffusion between the first metal and second metal thereby forming a varying percentage composition of the first and second metals of the first alloy system across a bonding region, the bonding region having at least one diffusion layer having the alloy minimum point percentage composition of the first and second metals, the heating of the assembled sandwich structure continuing to a bonding temperature of at least the first alloy system minimum melting point and holding the sandwich structure at the bonding temperature for a desired period of time to melt a desired portion of the bonding region comprising at least the alloy minimum point percentage composition of the first and second metals; and
   allowing the assembled sandwich structure to cool to a steady state temperature below first alloy system minimum melting point temperature.

2. The method of claim 1 wherein the bonding temperature is above the first alloy minimum melting point and is below both of the melting point of the first metal and second metal.

3. The method of claim 1 wherein the member of filler material includes a third metal different from the first and second metals and the second metal is plated on opposite sides of the third metal.

4. The method of claim 3 wherein the second and third metal are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

5. The method of claim 4 wherein the bonding temperature is at least the melting point for at least one of the first alloy system minimum melting point and the second alloy system minimum melting point.

6. The method of claim 1 wherein the ceramic insulator has an opposite facing second metallized surface and the first and second metalized surfaces comprise a desired amount of the first metal.

7. The method of claim 6 comprising placing a second member of filler material comprising the at least a second metal between the second metallized surface of the ceramic insulator and at least one cathode cup component comprising the first metal.

8. An x-ray tube cathode assembly comprising:
a support arm comprising a first metal;
a ceramic insulator having a first metalized surface wherein the metalized surfaces comprise a desired amount of the first metal;
a first member of filler material in contact with the support arm and the first metalized surface of the ceramic insulator, the first member of filler material comprising at least a second metal wherein a first alloy system comprising the first and second metals includes an alloy minimum point percentage composition of the first and second metals having a first alloy system minimum melting point for the alloy minimum point percentage composition that is lower than both of the melting point of the first metal and second metal;
a bonding region resulting from heating the cathode assembly causing diffusion bonding to proceed, the bonding region having a layer of alloy comprising the minimum point percentage composition, the heating of the cathode assembly continuing to a bonding temperature of at least the first alloy system minimum melting point and holding at that temperature for a desired period of time.

9. The x-ray tube cathode assembly of claim 8 wherein the bonding temperature is above the first alloy minimum melting point and is below both of the melting point of the first metal and second metal.

10. The x-ray tube cathode assembly of claim 8 wherein the member of filler material includes a third metal different from the first and second metals and the second metal is plated on opposite sides of the third metal.

11. The x-ray tube cathode assembly of claim 10 wherein the second and third metal are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

12. The x-ray tube cathode assembly of claim 11 wherein the bonding temperature is at least the melting point for at least one of the first alloy system minimum melting point and the second alloy system minimum melting point.

13. The x-ray tube cathode assembly of claim 8 wherein the ceramic insulator has an opposite facing second metallized surface and the first and second metalized surfaces comprise a desired amount of the first metal.

14. The x-ray tube cathode assembly of claim 13 comprising placing a second member of filler material comprising the at least a second metal between the second metallized surface of the ceramic insulator and at least one cathode cup component comprising the first metal.

15. An x-ray tube cathode assembly comprising:
a support arm comprising a sufficient amount of a first metal for diffusion bonding with a different second metal to form a first alloy system;
a ceramic insulator having a first metallized surface; and
means for securing the support arm to the ceramic insulator, the means for securing comprising a metal sheet comprising a third metal, the metal sheet plated on each side with the second metal, the third metal a different metal than either of the first and second metals, the means for securing disposed at an interface between a first surface of the support arm and the first metallized surface of the ceramic insulator, wherein a portion of the first alloy system including a percentage composition of the first and second metals that has a minimum melting point that is lower than both of the melting point of the first metal and second metal.

16. The x-ray tube cathode assembly of claim 15 wherein the second and third metal are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

17. The x-ray tube cathode assembly of claim 15 wherein the first metal is nickel.

18. An X-ray tube comprising:
an evacuated envelope;
an anode assembly located within the evacuated envelope; and
a cathode assembly located within the envelope in operative relationship to the anode assemble, the cathode assembly comprising:
a support arm comprising a sufficient amount of a first metal for diffusion bonding with a different second metal;
a ceramic insulator having a first metallized surface and an opposite facing second metallized surface; and
means for securing the support arm to the ceramic insulator, the means for securing comprising a metal sheet comprising a third metal, the metal sheet plated on each side with the second metal, the third metal a different metal than either of the first and second metals, the means for securing disposed at an interface between a first surface of the support arm and the first metallized surface of the ceramic insulator, wherein a portion of an alloy including the first and second metal comprises a percentage composition of the first and second metals that has a minimum melting point for the percentage composition that is lower than both of the melting point of the first metal and second metal.

19. The X-ray tube of claim 18 wherein the second and third metal are diffusible to form a second alloy system different than the first alloy system and the second alloy system includes an alloy minimum point percentage composition of the second and third metals having a second alloy system minimum melting point for the alloy minimum point percentage composition that is lower than both of the melting point of the third metal and second metal.

20. The X-ray tube of claim 18 comprising a second means for securing between the second metallized surface of the ceramic insulator and at least one cathode cup.

* * * * *